(12) United States Patent
Schroeder et al.

(10) Patent No.: US 8,884,475 B2
(45) Date of Patent: Nov. 11, 2014

(54) PLASTIC COMMUTATOR BRUSH BOXES AND BEARING SEAT

(75) Inventors: Patrick Schroeder, Buehl (DE); Peter Bohr, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 1541 days.

(21) Appl. No.: 12/294,997

(22) PCT Filed: Feb. 7, 2007

(86) PCT No.: PCT/EP2007/051150
§ 371 (c)(1),
(2), (4) Date: Sep. 29, 2008

(87) PCT Pub. No.: WO2007/113029
PCT Pub. Date: Oct. 11, 2007

(65) Prior Publication Data
US 2011/0031823 A1 Feb. 10, 2011

(30) Foreign Application Priority Data
Mar. 30, 2006 (DE) .................. 10 2006 014 762

(51) Int. Cl.
*H02K 1/04* (2006.01)
*H02K 5/00* (2006.01)
*H02K 5/16* (2006.01)
*H02K 5/14* (2006.01)
*H02K 5/167* (2006.01)

(52) U.S. Cl.
CPC .................. *H02K 5/1672* (2013.01); *H02K 5/148* (2013.01)
USPC ................. 310/43; 310/90; 310/91; 310/239

(58) Field of Classification Search
USPC ..................... 310/239–247, 90, 91
IPC .............................. H02K 5/14,13/00
See application file for complete search history.

(56) References Cited

U.S. PATENT DOCUMENTS

| 2,991,379 | A | * | 7/1961 | Van Dam ..................... 310/247 |
| 5,320,788 | A | * | 6/1994 | Schneider et al. ........... 264/1.28 |
| 5,818,142 | A | * | 10/1998 | Edleblute et al. ........... 310/239 |
| 6,798,109 | B2 | * | 9/2004 | Ortt et al. .................... 310/239 |
| 6,909,218 | B2 | * | 6/2005 | Ortt et al. .................... 310/239 |
| 7,053,516 | B2 | * | 5/2006 | Yu .................................. 310/239 |

(Continued)

FOREIGN PATENT DOCUMENTS

| DE | 10223529 A1 | 1/2003 |
| FR | 2723481 A1 | 2/1996 |
| GB | 1241395 | 8/1971 |

OTHER PUBLICATIONS

FR002723481A1 Translation, EPO, http://ep.espacenet.com/.*

*Primary Examiner* — Tran Nguyen
*Assistant Examiner* — Thomas Troung
(74) *Attorney, Agent, or Firm* — Michael Best & Friedrich LLP

(57) ABSTRACT

The invention reduces vibration in a plastic element used in an electrical drive. The plastic element has a baseplate, at least two commutator brush boxes leading to a shaft passage channel which passes through the baseplate, and a bearing seat which is connected to the baseplate via at least one supporting arm for holding a shaft bearing. The invention provides for the entire contact area of the supporting arm with the baseplate to be arranged at a lateral distance from the commutator brush boxes.

18 Claims, 4 Drawing Sheets

(56) References Cited

U.S. PATENT DOCUMENTS

| | | |
|---|---|---|
| 7,554,239 B2* | 6/2009 | Suzuki .......................... 310/239 |
| 7,723,893 B2* | 5/2010 | West et al. .................... 310/244 |
| 2004/0012283 A1 | 1/2004 | Kitoh et al. |
| 2004/0084990 A1* | 5/2004 | Ortt et al. ...................... 310/239 |
| 2004/0164643 A1* | 8/2004 | Ortt et al. ...................... 310/239 |
| 2004/0263022 A1* | 12/2004 | Yu ................................. 310/239 |
| 2005/0174010 A1* | 8/2005 | Porter et al. .................. 310/239 |
| 2006/0028088 A1* | 2/2006 | McFarland et al. ........... 310/239 |
| 2007/0108864 A1* | 5/2007 | Suzuki .......................... 310/239 |

* cited by examiner (B)

(A-A)

(C-C)

PLASTIC COMMUTATOR BRUSH BOXES AND BEARING SEAT

CROSS-REFERENCE TO RELATED APPLICATION

This application is a 35 USC 371 application of PCT/EP 2007/051150 filed on Feb. 7, 2007,

BACKGROUND OF THE INVENTION

1. Field of the Invention

The invention relates to a plastic element used in electrical drives, especially in vehicles, and preferably in power window systems.

2. Description of the Prior Art

A plastic element of this kind is shown for instance in German Patent Disclosure DE 100 06 350 A1. The plastic element has multiple functions. It forms a bearing seat for receiving a shaft bearing, in particular a collar bearing, in a manner fixed against relative rotation, for a drive shaft connected to the rotor of a direct current electric motor in a manner fixed against relative rotation. In addition, the plastic element has at least two diametrically opposed commutator brush boxes, extending orthogonally to a shaft passage channel for the drive shaft. These commutator brush boxes serve to receive commutator brushes or current inverter brushes, also called carbon brushes, which rest, diametrically opposite one another, radially on a commutator seated on the drive shaft. The commutator brushes are supported displaceably inside the commutator brush boxes and are supplied with direct current. The commutator brush boxes serve to deliver current to the rotor winding.

In the known plastic element, the commutator brush boxes are passed directly through two parallel supporting arms for mounting the bearing seat for the shaft bearing. The problem is that vibration, especially in the acoustical, audible range, is transmitted from the commutator brushes, resting on the drive shaft or on the commutator, directly to the shaft bearing via the supporting arms of the bearing seat and from the shaft bearing to the gearbox, resting on the shaft bearing, of the electrical drive. The gearbox forms a resonant body for the vibration emitted by the commutator brushes, and this leads to unwanted noise production.

OBJECT AND SUMMARY OF THE INVENTION

The object of the invention is to propose an improved plastic element, with which the noise production of electrical drives can be reduced.

The invention is based on the concept of having the at least one supporting arm for mounting the bearing seat for the shaft bearing connect to the baseplate with lateral spacing from the commutator brush boxes. The contact area between the supporting arm and the baseplate is thus disposed entirely laterally offset from the commutator brush boxes, and not directly above them as in the prior art. Basically it does not matter whether the contact area of the supporting arm is spaced apart from and next to the commutator brush boxes, or whether the supporting arm is connected to the baseplate with lateral spacing above the commutator brush boxes or with lateral spacing below them. Primarily, what is important is only the lateral spacing of the entire contact area from the commutator brush boxes. As a result of the where the at least one supporting arm is disposed according to the invention, the commutator brush boxes and the bearing seat are decoupled from each other in terms of vibration. Because of this decoupling, the transmission of vibration from the commutator brushes to the bearing seat and thus to the gearbox is reduced, as a result of which the noise emission is reduced considerably in turn.

Preferably, the commutator brush boxes extend directly toward one another, or in other words have a common longitudinal center axis, which together with the longitudinal center axis of the shaft passage channel defines a common center plane. In this case, the connection point or contact area between the at least one supporting arm and the baseplate is spaced apart from an outer plane that extends parallel to the aforementioned center plane. The outer plane extends through the area of the commutator brush boxes that is located the farthest outward laterally; that is, it contains the outermost longitudinal axis of the commutator brush boxes, which extends parallel to the common longitudinal center axis of the commutator brush boxes. The farther away the supporting arm is connected to the baseplate laterally from the commutator brush boxes, the better is the vibrational decoupling between the bearing seat and the commutator brush boxes.

Preferably, the disposition of the supporting arm or supporting arms is made asymmetrically to the common center plane, especially in such a way that supporting arms for the bearing seat are provided only on one side of the center plane.

It has proved advantageous to provide four flexible arms, which receive the bearing in clamping fashion, as the bearing seat. The arms are preferably disposed on the order of a grasping hand, and upon introduction of the shaft bearing they bend elastically outward.

In a preferred embodiment, two arms each are combined into one U-shaped element, and the two U-shaped elements are preferably disposed symmetrically to a plane extending orthogonally to the common center plane. One arm of a U-shaped element is preferably located on each side of the center plane.

On each U-shaped element, in a refinement of the invention, one supporting arm is provided; to increase the stability, the two supporting arms can be connected to one another via a connecting bridge that is spaced apart from the baseplate. It is advantageous for the supporting arms to be disposed asymmetrically to the center plane, in particular in such a way that both supporting arms are disposed on one side of the center plane and are spaced apart from one another in the longitudinal direction of the commutator brush boxes. As a result of the asymmetrical disposition relative to the center plane, more space is obtained, which can be used for instance for the disposition of electronic components.

To lend the supporting arms a further functionality, it is advantageous that the supporting arms have a substantially L-shaped cross section; preferably, one leg of each supporting arm extends parallel to the commutator brush boxes, and the other leg extends in the direction away from the commutator brush boxes. Thus the two supporting arms form the corner edges of a U-shaped structure for receiving an electronic component, in particular a thermostatic switch. Preferably, different bearing elements are provided for a 24-V and for a 12-V thermostatic switch.

It is especially advantageous if the side faces of the commutator brush boxes, with a substantially rectangular and preferably square cross section, are each disposed at an angle of 45° from a plane extending parallel to the upper side of the baseplate. As a result, the vibrational decoupling between the bearing seat and the commutator brush boxes can be improved still further.

In a preferred embodiment, on at least one side face of the commutator brush boxes and preferably on all the side faces, linear guides extending in the longitudinal direction of the commutator brush boxes are provided for the commutator brushes. In contrast to a full-surface contact of the commutator brushes with the side faces of the commutator brush boxes as known from the prior art, tilting of the commutator brushes inside the commutator brush boxes can be prevented by means of the linear guide. Because of the linear guidance of the commutator brushes in the commutator brush box, the inside diameter of the commutator brush box is no longer identical to the spacing between the side faces of the commutator brush box. In the area between the commutator brushes and the side faces of the commutator brush boxes, raised areas may be present, such as an injection molding skin or a burr, without impairing the function.

BRIEF DESCRIPTION OF THE DRAWINGS

Further advantages and expedient embodiments will become apparent from the further claims, the description of the drawings, and the drawings themselves, in which:

DESCRIPTION OF THE PREFERRED EMBODIMENTS

Figure 1:
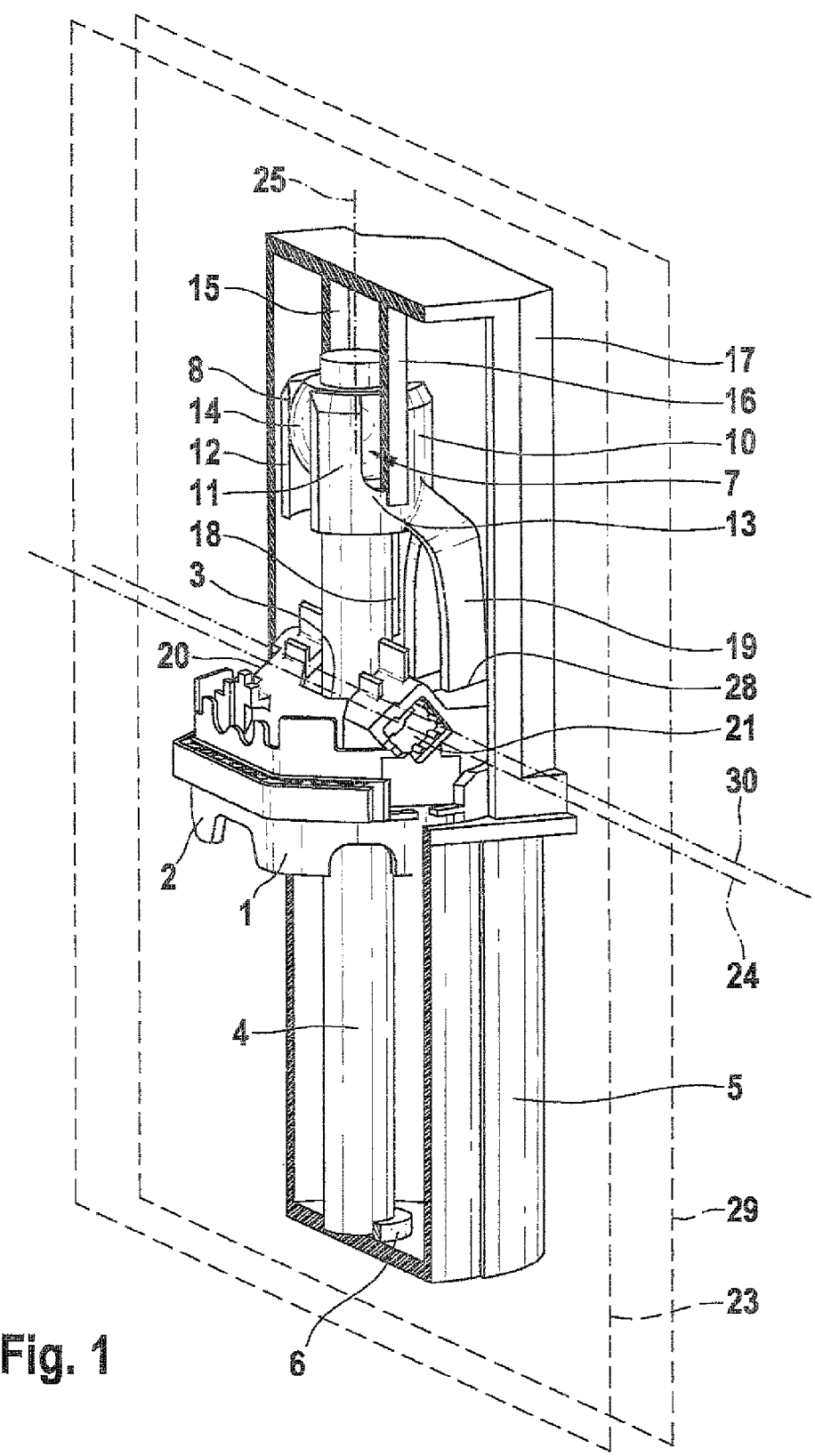
FIG. 1 is a schematic view of the arrangement of a plastic element in an electrical power window system.

In the drawings, identical components and components with the same function are identified by the same reference numerals.

In FIG. 1, a one-piece plastic element 1, embodied as a die-cast part, is shown, with a baseplate 2 and a shaft passage channel 3. A drive shaft 4 is extended through the shaft passage channel 3. The drive shaft 4 is the rotor shaft of a direct current electric motor, not shown, that is received in a stator housing 5. By means of a sintered bearing 6, the drive shaft 4 is supported radially in the stator housing and can also be supported axially.

Spaced apart from the baseplate 2, the one-piece plastic element 1 has a bearing seat 7, comprising four arms 8, 9, 10, 11, which form the parallel legs of two U-shaped elements 12, 13. The arms 8, 9, 10, 11 serve to receive a shaft bearing 14, embodied as a collar bearing in clamping fashion, for radially supporting the drive shaft 4. With the aid of two struts 15, 16 of a gearbox 17, the shaft bearing 14 is secured in the bearing seat 7.

As can be seen from FIG. 1, the baseplate 2 is disposed between the stator housing 5 and the gearbox 17.

The course of the drive shaft 4 in the region behind the shaft bearing 14 in the gearbox 17, the latter shown only in fragmentary form, is not shown. For instance, the drive shaft 4 is connected in a manner fixed against relative rotation to a worm that meshes with a worm wheel supported rotatably in the gearbox 17. On the end of the drive shaft 4 diametrically opposite the lower end in terms of FIG. 1, the drive shaft 4 can be supported in both the axial and the radial directions in the gearbox 17.

The two U-shaped elements 12, 13 are connected to the upper side of the baseplate 2, the side facing toward the bearing seat 7, each via a respective supporting arm 18, 19.

The baseplate 2 furthermore has two diametrically opposed commutator brush boxes 20, 21, which extend orthogonally to the shaft passage channel 3. They serve to receive commutator brushes, current inverter brushes, or carbon brushes. The brushes have the function of supplying current to the armature windings, not shown, of the direct current electric motor and for that purpose rest radially in a known manner on a commutator, not shown, that is connected to the drive shaft 4 and are of different polarities.

As seen from FIG. 1, the supporting arms 18, 19 are connected to the baseplate 2 with lateral spacing from the commutator brush boxes 20, 21 as well as slightly above a plane that extends parallel to the upper side of the baseplate and contains the common longitudinal center axis 24 of the commutator brush boxes 20, 21. This contact area 28, in the plane of the drawing, is disposed behind an outer plane 29 that is parallel to a center plane 23 and that contains the outer longitudinal axis 30 of the commutator brush boxes 20, 21. The common center plane 23 is defined by the common longitudinal center axis 24 of the commutator brush boxes 20, 21 and by the axis of rotation of the shaft, that is, the longitudinal center axis 25 of the shaft passage channel 3. The supporting arms 18, 19 extend substantially parallel to the center plane 23. The disposition of the supporting arms 18, 19 is asymmetrical relative to the center plane 23. All the supporting arms 18, 19 are disposed on one common side of the center plane 23. The center plane 23 extends exactly through the middle of two diametrically opposed arms 8, 9 and 10, 11, respectively, of the U-shaped elements 12, 13.

It is also conceivable for the commutator brush boxes to be disposed at an angle to one another, so that the respective longitudinal center axes also extend at an angle to one another. In that case, two center planes are the result, which intersect preferably, but not necessarily, at the longitudinal center axis 25 of the shaft passage channel 3. According to the invention, the supporting arms 18, 19 are disposed with lateral spacing from both these center planes and the outer planes that are parallel to these center planes.

Figure 2:
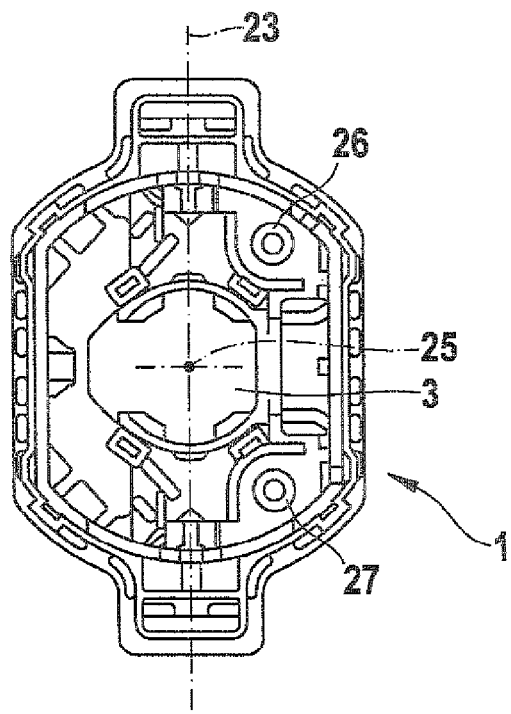
FIG. 2 shows the plastic element in a view from below.

From FIGS. 2 through 7, further details of the plastic element 1 of the invention can be seen. FIG. 2 shows the plastic element 1 in a view from below. The longitudinal center axis 25 of the shaft passage channel 3 is shown, which is perpendicular to the plane of the drawing. The center plane 23 is also indicated, which also extends perpendicular to the plane of the drawing. In the view in FIG. 2, two spring domes 26, 27 can be seen. They serve to receive leg springs, not shown, with which the commutator brushes are subjected to spring force in the direction of the longitudinal center axis 25.

Figure 3:
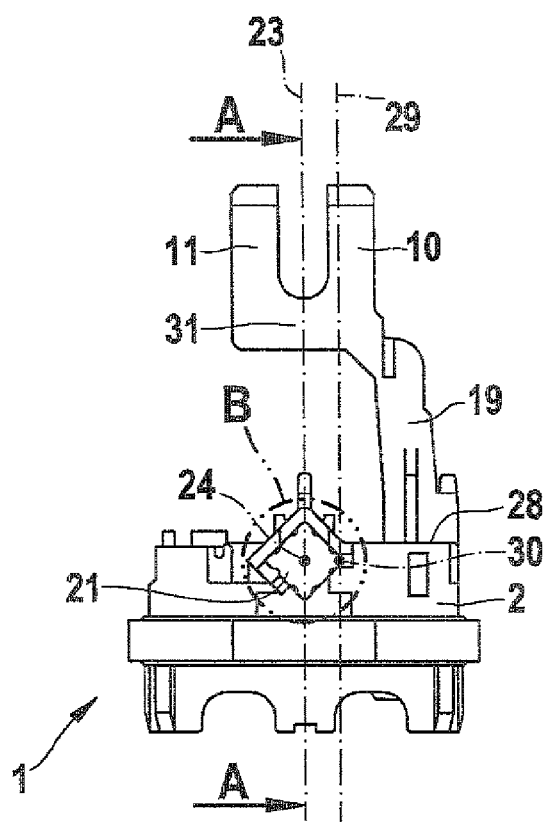
FIG. 3 shows the plastic element in a side view.

In FIG. 3, the plastic element 1 is shown in a side view. The contact area 28 between the supporting arm 19 and the baseplate 2 can be seen. The entire contact area 28 is located with lateral spacing from the commutator brush boxes 20, 21. In other words, the contact area 28 is spaced apart from the center plane 23 and is also outside and spaced apart from the outer plane 29. The outer plane 29 extends parallel to the center plane 23 and intersects the commutator brush boxes in their laterally outermost region, and thus contains the outer longitudinal axis 30 of the commutator brush boxes 20, 21. In the event that the commutator brush boxes do not have a common longitudinal center axis 24 but instead have longitudinal center axes that are at an angle to one another, then the outer planes are also at an angle to one another. According to the invention, the supporting arms 18, 19 then feed into the baseplate 2 in a manner that is laterally offset from these outer planes.

The arms 8, 9, 10, 11 supported by the supporting arms 18, 19, or the bottom legs 31, 32 connecting the arms, are braced by the supporting arms 18, 19 in such a way that the area between the commutator brush boxes 20, 21 and the U-shaped elements 12, 13 is free of components or elements of the plastic element 1. Electronic components, for instance, can be accommodated here.

Figure 5:
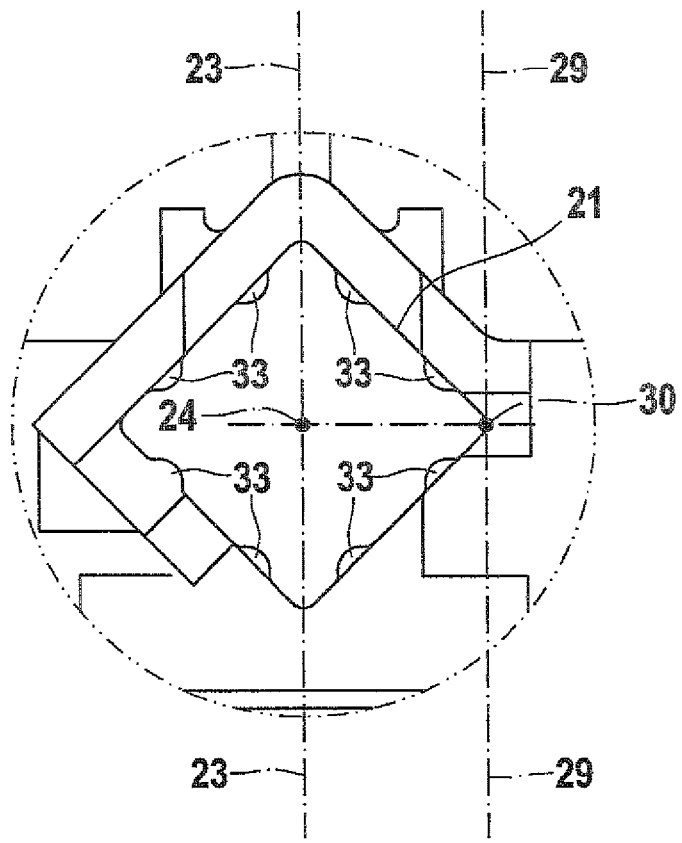
FIG. 5 is an enlargement of the detail B in FIG. 3.

As can be seen from FIGS. 3 and 5, the cross-sectional area of the commutator brush boxes is essentially square in shape and is disposed such that all the side walls of the commutator brush boxes 20, 21 are at an angle of 45° to the center plane 23 that extends perpendicular to the upper side of the baseplate.

Figure 4:
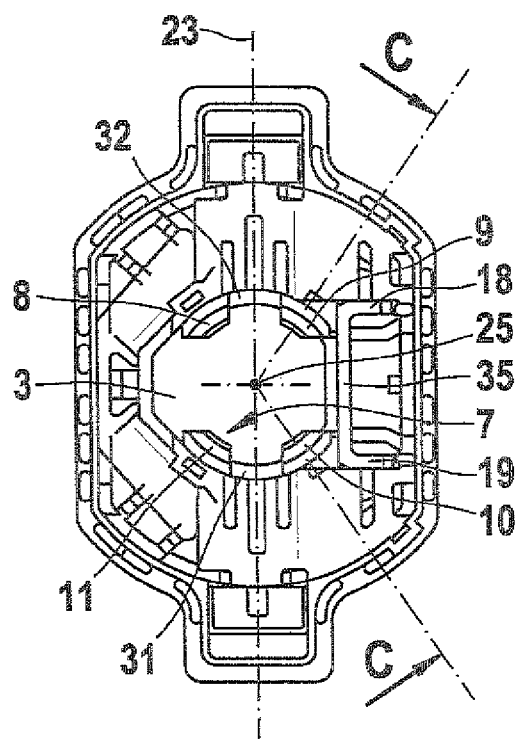
FIG. 4 shows the plastic element in a top view.

In FIG. 4, the plastic element 1 is shown in a top view. The longitudinal center axis 25, perpendicular to the plane of the drawing, of the shaft passage channel 3 can be seen, as can the center plane 23. The arms 8, 11 are located in the plane of the drawing, to the left of the center plane 23. The other two arms 9, 10 on the right of the center plane. Beside the two arms 9, 19 in FIG. 4, a connecting bridge 35 is shown between the supporting arms 18, 19. The L-shaped cross section of the supporting arms 18, 19 can also be seen, each with one leg extending parallel to the center plane 23 and one leg extending perpendicular to the center plane 23 and pointing away from the commutator brush boxes 20, 21. In the top view shown in FIG. 4, the supporting arms 18, 19 form a kind of U-shaped element, which is suitable for receiving thermostatic switches. Both larger 24-V thermostatic switches and smaller 12-V thermostatic switches can be inserted from above in the direction of the baseplate 2.

In FIG. 5, the detail B of FIG. 3 is shown. The commutator brush box 21 can be seen, with its four side walls at a 45° angle from the center plane 23. On each side wall, there are two parallel linear guides 33, extending in the longitudinal direction, or in other words the direction of the longitudinal center axis 24, for guiding the commutator brushes. By means of the linear guides, seizing of the commutator brushes in the commutator brush box 21 is avoided.

Figure 6:
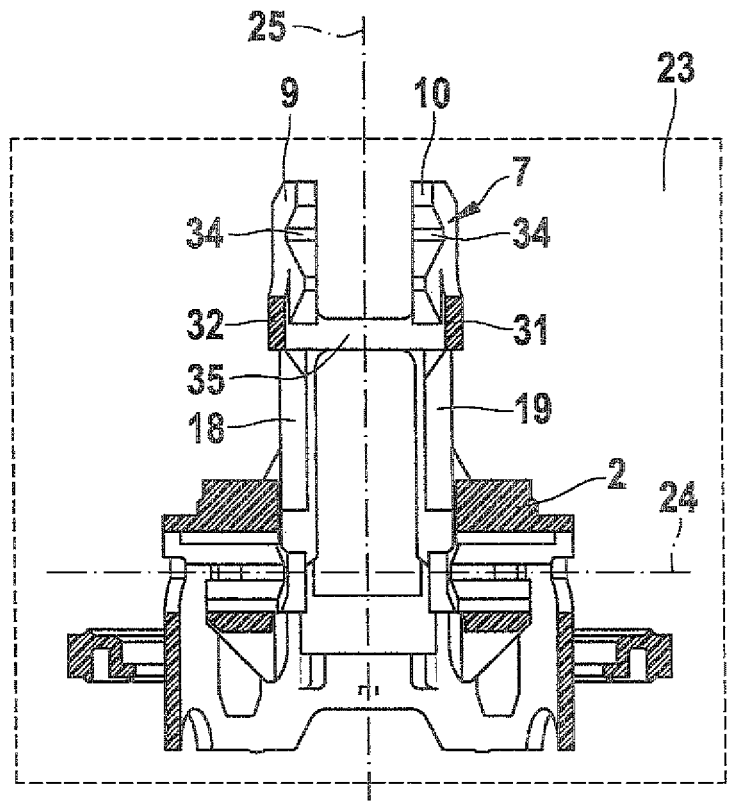
FIG. 6 is a sectional view of the plastic element taken along the line A-A in FIG. 3.

In FIG. 6, a sectional view of the plastic element is shown along the line A-A in FIG. 3. The sectional plane is equivalent to the center plane 23. Recesses 34 can be seen in the center region of the arms 9, 10, for receiving the shaft bearing 14 (see FIG. 1).

In FIG. 6, the connecting bridge 35 can be seen, extending spaced apart from the upper side of the baseplate 2 and located between the supporting arms 18, 19; it extends essentially parallel to the longitudinal center axis 24. Providing this connecting bridge 35 increases the stability of the bearing seat arrangement.

Figure 7:
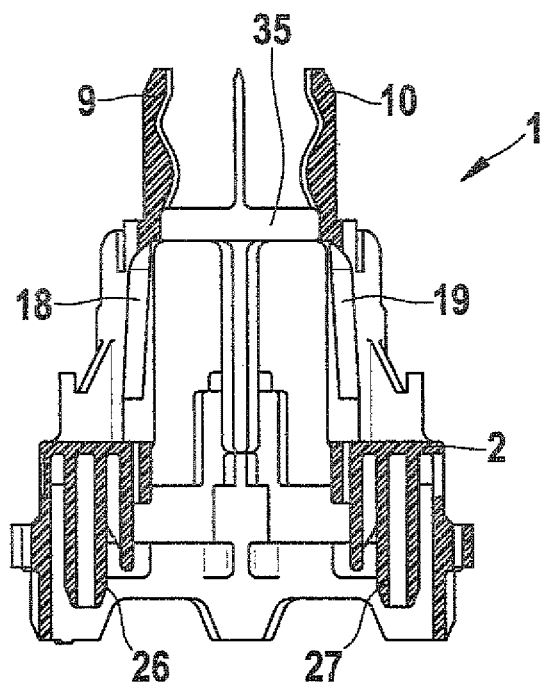
FIG. 7 is a sectional view of the plastic element taken along the line C-C in FIG. 4.

In FIG. 7, a sectional view of the plastic element 1 along the line C-C in FIG. 4 is shown. The connecting bridge 35 between the supporting arms 18, 19 is clearly seen.

The foregoing relates to the preferred exemplary embodiment of the invention, it being understood that other variants and embodiments thereof are possible within the spirit and scope of the invention, the latter being defined by the appended claims.

The invention claimed is:

1. A plastic element comprising:
a baseplate;
a shaft passage channel extending through the baseplate, said shaft passage channel having a longitudinal center axis;
at least two commutator brush boxes extending toward the shaft passage channel, said commutator brush boxes having side faces that are disposed at an angle of 45° to a plane extending parallel to an upper side of the baseplate, said commutator brush boxes further having a common longitudinal center axis which is substantially orthogonal to the longitudinal center axis of the shaft passage channel, wherein said side faces of said brush boxes surround said common longitudinal center axis;
a bearing seat for receiving a shaft bearing, which bearing seat is connected to the baseplate;
at least one supporting arm connecting the bearing seat to the baseplate, wherein an entire contact area between the at least one supporting arm and the baseplate is disposed at lateral spacing from the commutator brush boxes.

2. The plastic element as defined by claim 1, wherein the commutator brush boxes are diametrically opposite one another.

3. The plastic element as defined by claim 2, wherein the bearing seat has four flexible arms for receiving the shaft bearing in a clamping manner.

4. The plastic element as defined by claim 3, wherein pairs of two of the flexible arms each form parallel legs of a U-shaped element.

5. The plastic element as defined by claim 4, wherein one of the at least one supporting arm is associated with each U-shaped element and those two supporting arms are spaced apart from one another in the longitudinal direction of the commutator brush boxes.

6. The plastic element as defined by claim 5, wherein the two supporting arms are connected to one another via a connecting bridge extending parallel to the longitudinal center axis of at least one of the commutator brush boxes.

7. The plastic element as defined by claim 2, wherein a cross-sectional area of the commutator brush boxes is square in shape.

8. The plastic element as defined by claim 2, wherein linear guides for guiding commutator brushes are provided inside the commutator brush boxes.

9. The plastic element as defined by claim 1, wherein the bearing seat has four flexible arms for receiving the shaft bearing in a clamping manner.

10. The plastic element as defined by claim 9, wherein a pair of two of the flexible arms each form parallel legs of a U-shaped element.

11. The plastic element as defined by claim 10, wherein one of the at least one supporting arm is associated with each U-shaped element and those two supporting arms are spaced apart from one another in the longitudinal direction of the commutator brush boxes.

12. The plastic element as defined by claim 11, wherein the two supporting arms are connected to one another via a connecting bridge extending parallel to the longitudinal center axis of at least one of the commutator brush boxes.

13. The plastic element as defined by claim 9, wherein the baseplate, the at least one supporting arm, and the bearing seat are embodied in one piece as a die-cast part.

14. The plastic element as defined by claim 11, wherein a cross-sectional area of the commutator brush boxes is square in shape.

15. The plastic element as defined by claim 1, wherein a cross-sectional area of the commutator brush boxes is square in shape.

16. The plastic element as defined by claim 1, wherein the baseplate, the at least one supporting arm, and the bearing seat are embodied in one piece as a die-cast part.

17. The plastic element as defined by claim 1, wherein linear guides for guiding commutator brushes are provided inside the commutator brush boxes.

18. A plastic element comprising:
a baseplate;
a shaft passage channel extending through the baseplate;
at least two commutator brush boxes extending toward the shaft passage channel;
a bearing seat for receiving a shaft bearing, which bearing seat is connected to the baseplate, said bearing seat comprising four flexible arms for receiving the shaft bearing, said four flexible arms forming parallel legs of two U-shaped elements, said U-shaped elements being open in a direction facing away from said baseplate;

at least one supporting arm connecting the bearing seat to the baseplate, wherein an entire contact area between the at least one supporting arm and the baseplate is disposed at lateral spacing from the commutator brush boxes.

\* \* \* \* \*